United States Patent [19]
Janke et al.

[11] 3,729,833
[45] May 1, 1973

[54] DRYNESS SENSOR CIRCUIT WITH STATIC ELIMINATING MEANS FOR DRYER

[75] Inventors: Donald E. Janke, Benton Harbor; Roque D. Marcade, Stevensville, both of Mich.

[73] Assignee: Whirlpool Corporation, Benton Harbor, Mich.

[22] Filed: Nov. 12, 1971

[21] Appl. No.: 198,352

[52] U.S. Cl.................................34/48, 307/91
[51] Int. Cl..................................F26b 21/00
[58] Field of Search..........................34/45, 48, 46; 73/73, 76; 317/49, 80; 307/93, 91, 118; 328/4; 340/235; 318/483

[56] References Cited

UNITED STATES PATENTS 3,660,909   5/1972   Wilcox.................................34/45
3,404,466  10/1968   Reid.....................................34/45
3,402,478   9/1968   Hetrick.................................34/53
3,211,929  10/1965   Paines et al.......................307/93

*Primary Examiner*—Carroll B. Dority, Jr.
*Assistant Examiner*—Paul Devinsky
*Attorney*—James S. Nettleton et al.

[57] ABSTRACT

A static suppression circuit is provided for a dryness sensor of a clothes dryer wherein the sensing electrodes of the sensor circuit have connected thereto circuit means which function as a charge source and a charge sink for respective opposite polarities of static signals.

7 Claims, 2 Drawing Figures

Patented May 1, 1973  3,729,833
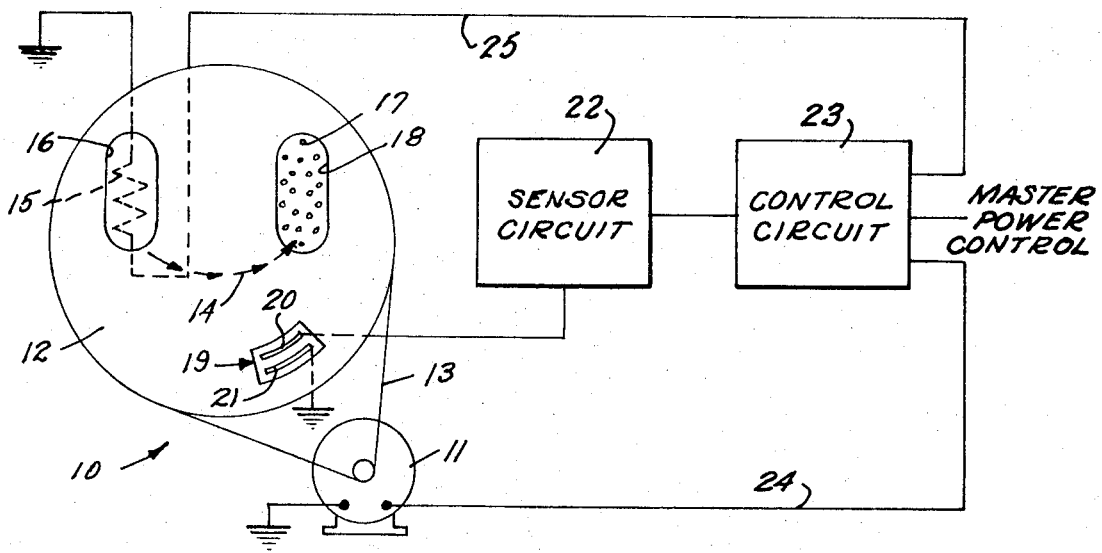
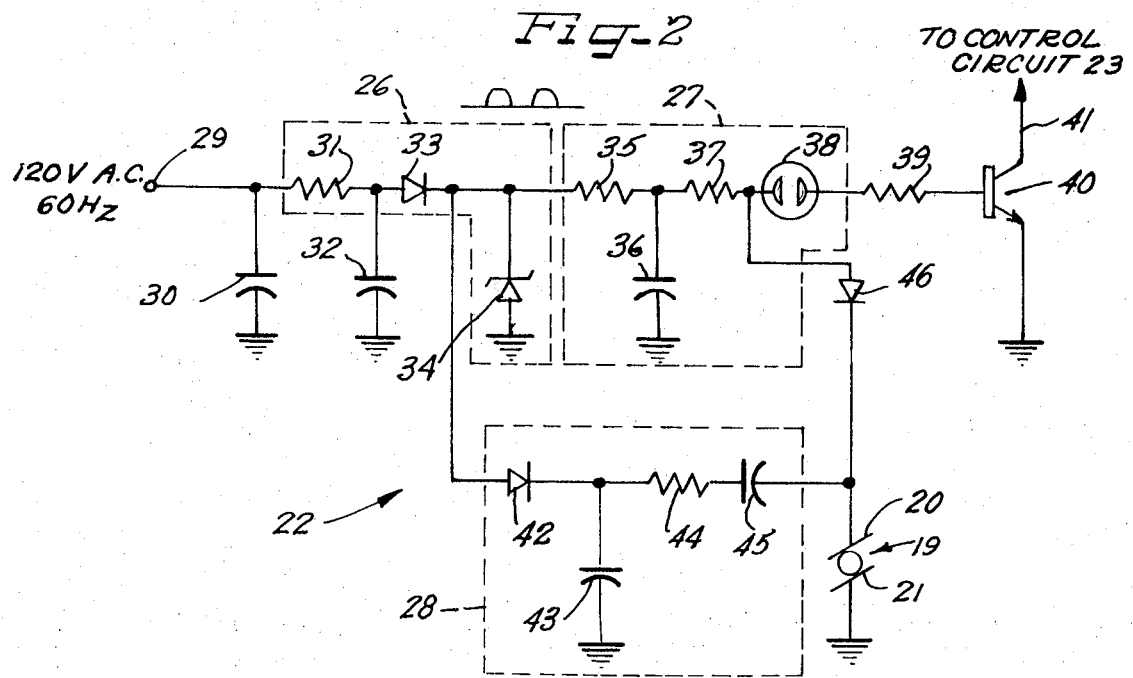
INVENTORS
Donald E Janke
Roque D. Marcade
BY  Kiel, Sherman, Meroni, Gross & Simpson ATTORNEYS

DRYNESS SENSOR CIRCUIT WITH STATIC ELIMINATING MEANS FOR DRYER

BACKGROUND OF THE INVENTION

1. Field of the Invention

This invention relates to a dryness sensing circuit, and is particularly concerned with a dryness sensing circuit having static suppression means for preventing false indications of dryness due to static charges generated by articles undergoing a drying process.

2. Description of the Prior Art

During a drying operation, erroneous dryness sensor signals are often generated across the sensor electrodes as the clothes load begins to dry. These erroneous signals include static signals which are generated as a result of static charges carried by the clothes load and must be dissipated or otherwise rejected by way of the dryness sensing circuit. It is readily evident that such erroneous signals have a tendency to limit the accuracy of dryness detection in many electronic dryness control circuits due to the initiation of transient signals in the sensor circuit in response to the occurrence of static charges. These transient signals are, of course, undesirable and may cause the circuit to provide false indications of dryness to the other portions of the dryer control circuit.

Generally, signals generated across the sensor electrodes in response to static charges are of short duration. However, these signals may be of such amplitudes that their effect on other portions of the sensor circuit, for example, an oscillator, can be of considerable duration unless steps are taken to dissipate or neutralize the static signals.

The prior art has heretofore generally ignored or failed to recognize the static charge problem associated with moisture sensing in dryer control circuits and has accordingly failed to provide protection from such erroneous signals.

SUMMARY OF THE INVENTION

It is therefore the primary object of the present invention to provide a dryness sensor circuit which neutralizes the effect of static charges applied across the moisture sensing electrodes in order to provide accurate indications of dryness.

The foregoing objective is realized according to a primary feature of this invention through the provision of means connected to the moisture sensing electrodes for absorbing charge in response to a first polarity of static signals and for supplying charge in response to the oppsoite polarity of static signals. The static suppression means includes a charging capacitor coupled across the sensor electrodes, a power supply circuit connected to the charging capacitor for charging the charging capacitor to a predetermined level and a coupling capacitor for coupling the charging capacitor to one of the moisture sensing electrodes.

BRIEF DESCRIPTION OF THE DRAWINGS

The foregoing and other objects, features and advantages of the invention, its organization, construction and operation, will be best understood from the following detailed description of a preferred embodiment thereof taken in conjunction with the accompanying drawing, in which:

FIG. 1 is a schematic diagram of a clothes dryer which includes a dryness sensor circuit constructed in accordance with the principles of the present invention; and FIG. 2 is a schematic circuit diagram of a dryness sensor circuit according to the invention.

DESCRIPTION OF THE PREFERRED EMBODIMENT

A clothes dryer is generally illustrated at 10 in FIG. 1 as comprising a drive motor 11 for driving a drum 12 by means of a belt 13. The drum 12 provides a drying treatment zone through which a stream of heated air, indicated by the arrows 14, is caused to flow. The stream of air is heated by a heater 15 which is disposed in an air inlet duct 16, and the moisture laden stream is discharged by way of an exhaust duct 18 having a filter 17 therein. The interior of the drum 12 is provided with a moisture sensor 19 having a pair of moisture sensing electrodes 20, 21, which are periodically bridged by the tumbling clothes load.

The moisture sensing electrode 21 is connected to ground and the moisture sensing electrode 20 is connected to a sensor circuit 22 which is operable to provide dryness signals to a dryer control circuit 23. The dryer control circuit 23 is provided with a plurality of outputs for controlling the various functional elements of the dryer. One of these outputs 24 is connected to the drive motor 11 for controlling the operation of the motor 11 and a fan (not shown) which effects the flow of air through the drum 12. Another output 25 of the control circuit 23 is connected to the heater 15 for controlling the energization thereof and thus controlling heating of the air stream 14. The control circuit 23 may be provided with other outputs including a master power control output which governs the opening and closing of the master power circuit for the machine.

The dryer control generally outlined above and illustrated in FIG. 1 may be an all electronic control circuit as disclosed by Donald E. Janke in his U.S. Pat. application Ser. No. 129,008, filed Mar. 29, 1971, or an electromechanical dryer control having a timer motor, such as disclosed by Alvin J. Elders in U.S. Pat. No. 3,497,964, both of which are assigned to Whirlpool Corporation, the assignee of the present application.

FIG. 2 is a detailed schematic circuit diagram of a sensor circuit which may be employed with the dryer control circuit of FIG. 1. The sensor circuit 22 includes a power supply 26, an oscillator 27 and a static suppression circuit 28. The power supply 26 is connected by way of an input terminal 29 to a commercial AC voltage supply. A capacitor 30 and a capacitor 32 may be provided for transient suppression. The power supply 26 comprises a resistor 31, a diode 33 and a Zener diode 34 which operate to supply half wave regulated voltage to the oscillator 27 and the static suppression circuit 28. The oscillator 27 includes a pulse generator comprising a resistor 35, a capacitor 36 and a resistor 37 for pulsing a neon lamp 38. The oscillator 27 is free-running and delivers pulses to the base of a transistor 40 by way of a resistor 39 one or more times for each cycle of the commercial AC waveform. The transistor 40 correspondingly supplies output pulses by way of its collector 41 to the control circuit 23 one or more times for each line cycle. This frequency of pulsing to the control circuit 23 is highly advantageous for an electronic dryer control circuit such as disclosed in the aforementioned application of Donald E. Janke, Ser. No. 129,008 in that the control circuit of that application utilizes a clock input whicn is derived from a 60-cycle line voltage to drive a first counter and a second counter. Overflow operation of the second counter effects resetting of the first counter to prevent extended time accumulations. Therefore, continuous resetting of the second counter permits time accumulation by the first counter and provides for a timed sequence of events in the control circuit.

The moisture sensing electrode 20 is connected to the junction between the resistor 37 and the neon lamp 38 by way of a diode 46 and provides a path for discharging the capacitor 36 whenever clothes having a sufficient moisture content bridge the electrodes 20, 21. Therefore, during the drying operation, the oscillator 27 is prevented from pulsing the transistor 40. In the just-mentioned type of control circuit, the second counter would therefore continuously overflow to continuously reset the first counter and prevent time accumulation. As the clothes load becomes increasingly dry, the number of pulses produced by the oscillator 27 increases until such time as a substantially constant train of oscillator pulses is produced. Such a continuous pulse train would effect continuous resetting of the second counter of the aforementioned control circuit and therefore permit time accumulation and a resulting termination of the drying operation to be effected by way of the first counter.

The static elimination or suppression circuit 28 comprises a diode 42, a resistor 44 and a capacitor 45 connected in series between the moisture sensing electrode 20 and the junction between the diode 33 and the Zener diode 34. The circuit also includes a capacitor 43 connected between ground and the junction of the diode 42 and the resistor 44. The capacitor 43 is charged to a predetermined level from the power supply 26 by way of the diode 42. This charge stored in capacitor 43 operates to supply current to the sensing electrodes when a negative static charge is present on the electrode 20 with respect to the electrode 21. When a positive static charge is present across the electrodes, the capacitor 43 functions as a current sink to eliminate the effects of such charge on the oscillator circuit.

The charging and discharging of the capacitor 43 for static signals occurs by way of the resistor 44 and the capacitor 45 which acts as a coupling capacitor. The time constant of this circuit is selected so as to take advantage of the fact that static signals are generally of a higher frequency than signals produced by the clothes load and the circuit is allowed to supply or sink a considerable amount of current for only a brief duration. Therefore, the current source and sink functions only affect the initial portion of the longer duration signals which represent true conductivity measurement of the fabric bridging the electrodes.

The desired dryness level may be varied by providing the resistor 35 as an adjustable element.

By way of example only, resistors 31, 35, 37, 39, and 44 may be 15K$\Omega$, 100K$\%$ to 10M$\Omega$, 1K$\%$, 27K$\Omega$, and 1K$\Omega$, respectively. Similarly, capacitors 30, 32, 36, 43, and 45 may have values of 0.22$\mu$f, 0.05$\mu$f, 50$_p$f, 0.33$\mu$f, and 0.01$\mu$f, respectively. The Zener diode 34 may have a Zener voltage of 82 volts.

Although we have described our invention by reference to a specific illustrative embodiment thereof, many changes and modifications may become apparent to those skilled in the art and it is our intention that the patent warranted hereon cover all such changes and modifications as may reasonably and properly be included within the scope of our contribution to the art.

The embodiments of the invention in which an exclusive property or privilege is claimed are defined as follows:

1. In a moisture sensing dryer control having electrodes for contacting the clothes load, means for drying the clothes load, a sensing circuit connected to said electrodes for generating a signal indicative of the moisture content of the clothes load and a control circuit for controlling operation of the drying means in accordance with signals received from said sensing circuit, the improvement therein comprising
   a static suppression circuit AC coupled to said electrodes and operable to supply charge for a brief interval in response to the occurrence of a potential of a first polarity across said electrodes and to accept charge for a brief interval in response to the occurrence of a potential of the opposite polarity across said electrodes.

2. The dryer control according to claim 1, wherein said static suppression circuit comprises a capacitor for accepting and receiving charge, power supply means connected to said capacitor charging said capacitor to a predetermined voltage, and coupling means effecting an AC coupling between said capacitor and said electrodes.

3. The dryer control according to claim 2, wherein said coupling means comprises a resistor and a second capacitor connected in series between the junction of said power supply means and the first-mentioned capacitor and one of said electrodes.

4. Apparatus for controlling the operation of a dryer in accordance with the moisture content of a load which may generate static signals, comprising:
   a pair of electrodes for contacting the load, one of said electrodes connected to a reference potential;
   a power supply;
   an oscillator connected to said power supply and operable to generate a train of pulses;
   means connecting the other of said electrodes to said oscillator whereby contact of a moist load by said electrodes acts to inhibit operation of said oscillator; and
   a static suppression circuit connected between said power supply and said other electrode operable to supply or sink charge in response to respective different polarities of static signals received across said electrodes.

5. Apparatus according to claim 4, wherein said connecting means includes a diode connected between said other electrode and said oscillator.

6. Apparatus according to claim 4, wherein said power supply includes an input for receiving an AC waveform and an output, and a Zener diode connected across said output to regulate the output voltage to said oscillator and to said static suppression circuit.

7. Apparatus according to claim 4, wherein said suppression means includes a first capacitor connected to the reference potential, a diode connecting said first capacitor to said power supply to receive a predetermined charge, and a resistor and a second capacitor connected in series between said first capacitor and the other of said electrodes for providing an AC coupling therebetween for effecting a charge supply and sink path for static signals.

* * * * *